(12) United States Patent
Kunze et al.

(10) Patent No.: US 7,753,384 B2
(45) Date of Patent: Jul. 13, 2010

(54) FOUR-POINT SUSPENSION ARM

(75) Inventors: Ralf Kunze, Bad Essen (DE); Wolfgang Ratermann, Fuerstenau (DE); Reinhard Buhl, Bohmte (DE)

(73) Assignee: ZF Friedrichshafen, Friedrichshafen (DE)

(*) Notice: Subject to any disclaimer, the term of this patent is extended or adjusted under 35 U.S.C. 154(b) by 610 days.

(21) Appl. No.: 10/599,161

(22) PCT Filed: Mar. 1, 2005

(86) PCT No.: PCT/DE2005/000351

§ 371 (c)(1),
(2), (4) Date: Jun. 11, 2007

(87) PCT Pub. No.: WO2005/092645

PCT Pub. Date: Oct. 6, 2005

(65) Prior Publication Data

US 2007/0284841 A1    Dec. 13, 2007

(30) Foreign Application Priority Data

Mar. 23, 2004  (DE) .................. 10 2004 014 610

(51) Int. Cl.
*B60G 9/02* (2006.01)
(52) U.S. Cl. .................. 280/124.116; 280/124.143
(58) Field of Classification Search .......... 280/124.135, 280/124.107, 124.116, 124.143, 124.144, 280/124.133; 180/349
See application file for complete search history.

(56) References Cited

U.S. PATENT DOCUMENTS

| 6,010,142 A | * | 1/2000 | McCoy et al. ............ 280/490.1 |
| 6,129,367 A | * | 10/2000 | Bublies et al. ........ 280/124.107 |
| 6,808,191 B1 | * | 10/2004 | Buhl et al. ............ 280/124.107 |
| 2006/0244232 A1 | * | 11/2006 | Cortez et al. .......... 280/124.116 |

FOREIGN PATENT DOCUMENTS

| DE | 43 10 526 A1 | 10/1993 |
| DE | 195 21 874 A1 | 12/1996 |
| DE | 100 50 772 | 4/2002 |
| DE | 102 06 809 A1 | 9/2003 |
| EP | 1 057 665 A1 | 12/2000 |
| JP | 5-209696 | 8/1993 |
| JP | 2003-267016 | 9/2003 |
| JP | 2003-267017 | 9/2003 |

* cited by examiner

*Primary Examiner*—Paul N. Dickson
*Assistant Examiner*—Karen Jane J Amores
(74) *Attorney, Agent, or Firm*—McGlew and Tuttle, P.C.

(57) ABSTRACT

A four-point suspension control arm (1) is provided for the axle suspension of a rigid axle especially of a utility vehicle. The four-point control arm (1) has four bearing eyes (7, 8, 9, 10), wherein two bearing eyes (9, 10) can be connected to the rigid axle and two bearing eyes (7, 8) are to be connected to the vehicle frame, each in an articulated manner. The four-point control arm (1) is designed as a one-piece hollow housing (2, 3, 4, 5, 6), which can be twisted and is inscribed in the rectangle or trapezoid formed by the bearing eyes. The hollow housing (2, 3, 4, 5, 6) is formed essentially by a tube, which is arranged horizontally in respect to the vehicle and is open on both sides, with a cross section ranging from an essentially rounded rectangular to O-shaped.

20 Claims, 2 Drawing Sheets

FOUR-POINT SUSPENSION ARM

CROSS REFERENCE TO RELATED APPLICATIONS

This application is a United States National Phase application of International Application PCT/DE2005/000351 and claims the benefit of priority under 35 U.S.C. §119 of German Patent Application DE 10 2004 014 610.1 filed Mar. 23, 2004, the entire contents of which are incorporated herein by reference.

FIELD OF THE INVENTION

The present invention pertains to a four-point suspension arm (control arm) for the suspension of a rigid axle, especially for a utility vehicle.

BACKGROUND OF THE INVENTION

Four-point control arms of the type mentioned in the introduction have been used for some years especially in trucks and other utility vehicles. Such four-point control arms combine in only one component a number of functions and tasks, for which a plurality of control arms or components were necessary before in the area of the axle guide.

The need for additional roll stabilizers for roll stabilization of the vehicle body is eliminated, among other things, by the use of a four-point control arm, because the four-point control arm assumes, for example, together with the existing longitudinal control arms, both the task of axle guiding in the transverse and longitudinal directions and the task of absorbing torques and roll stabilization. The previously necessary three-point control arm can be eliminated as well. Thus, both the design effort and the weight of the vehicle are reduced to a considerable extent, which leads to reduced costs for manufacture, operation and maintenance of the utility vehicle.

Since roll stabilization by the four-point control arm does not take place, unlike in the case of the torsion bar, mostly behind the vehicle axle, but it can rather take place by means of the introduction of force into the vehicle chassis mostly in the area located in front of the vehicle axle, the vehicle may not, moreover, optionally require a reinforced closing cross arm either for absorbing rolling torques. This leads to additional cost savings and weight reductions.

Based on the sum of these advantageous properties, the four-point control arm, which usually has a cross or X shape for reasons of manufacturing technology, for cost and strength reasons as well as for reasons of low component weight, has become successful and widespread in an extremely short time, especially in the area of heavy utility vehicles.

Both forged four-point control arms and four-point control arms made of sheet metal as well as casting have been known in the state of the art, for example, from DE 195 21 874 or DE 102 06 809. However, there usually is a substantially more massive rectangular cross section for the arms of the four-point control arm in case of the forging process, which leads to heavy weight of the component and to high manufacturing costs associated therewith as well as to increased fuel consumption and reduced payload of the utility vehicle.

Built-up or welded four-point control arms are likewise complicated and consequently expensive to manufacture. By contrast, prior-art four-point control arms, which are designed as castings, see, for example, FIGS. 7, 8 or 11 in the document DE 195 21 874, are likewise complicated from various points of view and can be manufactured less reliably.

Thus, in four-point control arms with closed cavity geometry, there are only very limited possibilities of supporting the cavity-forming cores in such a way that the cores will not float during casting and therefore will not cause nonuniform wall thicknesses in the casting, which would correspondingly lead to unfavorable strength properties. Due to the same problem, such cast four-point control arms cannot be manufactured with the large cross section and therefore small wall thicknesses which are desired in terms of lightweight construction, which in turn leads to castings or four-point control arms with a needlessly heavy weight.

Other four-point control arms, for example, the four-point control arm which is shown in FIG. 11 of the document DE 195 21 874 and can be manufactured especially by casting, requires a plurality of cores for the manufacture, which in turn makes the manufacture complicated and therefore expensive. Moreover, due to the cavities present, the four-point control arm shown here cannot be optimally adapted to the prevailing load situation, which is characterized mostly by a combination of shear and bending, but is especially associated with high torsional loads.

SUMMARY OF THE INVENTION

Against this background, the object of the present invention is to provide a four-point control arm with which the drawbacks of the state of the art of this class can be overcome. The four-point control arm shall be able to be manufactured in an especially simple manner, with excellent reproducibility and at the same time at a low cost. Furthermore, it shall become possible in terms of lightweight construction, which is also desirable for utility vehicles, to manufacture four-point control arms specifically with excellent mechanical properties and at the same time reduced weight in a reliable process and in a cost-effective manner.

The four-point control arm according to the present invention, provided for guiding a rigid axle especially of a utility vehicle, is designed as an essentially one-piece hollow housing with four bearing eyes for connection to the axle or to the vehicle chassis. The hollow housing, which is inscribed concerning the shape of its outline in the rectangle or trapezoid formed by the bearing eyes, can be twisted at least slightly for receiving, for example, axle twistings. The four-point control arm according to the present invention is further provided such that the hollow housing is essentially in the form of a tube, which is open on a plurality of sides, for example, on two sides, and which is arranged horizontally in relation to the installation situation on the vehicle. The hollow housing or the tube has a cross section that has a shape ranging from the rounded rectangular shape (also called stadium curve) to O-shape or parabolic.

A hollow housing of a four-point control arm of such a design can, first, be manufactured in an extremely simple manner and in an extremely reliable process, largely independently from the manufacturing process employed. This is already linked with the fact that the open tube shape of the hollow housing represents a comparatively simple basic shape, which requires, regardless of a specific manufacturing process, only comparatively simple tools, and, furthermore, it has only a small or simple and non-fissured undercut as well as no closed cavities.

The four-point control arm, which is open on both sides and has essentially a tubular housing according to the present invention, is especially favorable, for example, but by no means exclusively in respect to manufacture by casting.

This is due to the fact that the core needed for preparing the cavity during casting can be supported in an excellent manner because the ends of the tubular hollow housing are open on both sides, as a result of which any hydrostatic floating of the core can be prevented from occurring with a high degree of certainty.

Moreover, it is even possible to use only a single core, which forms both the entire interior space of the hollow housing of the four-point control arm and the four bearing eyes of the four-point control arm. The four-point control arm can thus be manufactured both with a high process reliability and at an extremely low cost, but it is also possible at the same time to form thin-walled, large-volume and therefore rigid and lightweight geometries without problems with high precision.

However, because of the simple geometry, the shape of the four-point control arm according to the present invention is extremely advantageous with other manufacturing processes as well, for example, in the case of four-point control arms manufactured from forged or deep-drawn parts.

The present invention is embodied independently from whether the longitudinal axis of the tube forming the hollow housing extends along the longitudinal axis of the vehicle or along the transverse axis of the vehicle when the four-point control arm is arranged in a motor vehicle. Thus, it is conceivable, for example, that the longitudinal axis of the tube forming the hollow housing is arranged in the direction of the longitudinal axis of the vehicle, as a result of which especially high axial and/or polar geometrical moments of inertia and especially high section moduli, especially against rolling torsion about the longitudinal axis of the vehicle, can be reached depending on the cross-sectional shape and the size of the cross section.

However, according to an especially preferred embodiment of the present invention, the longitudinal axis of the tube forming the hollow housing extends at right angles to the longitudinal axis of the vehicle or in the transverse direction of the vehicle. This embodiment is especially advantageous when certain, defined stiffnesses or flexibilities in respect to torsion are required or when a certain, defined deformation characteristic of the four-point control arm in respect to the rolling motions of the vehicle body is necessary.

The exact shaping of the hollow housing is at first not of decisive significance for the embodiment of the present invention, either, as long as the hollow housing has essentially the tubular form described, which is easy to manufacture. The present invention is not, of course, limited to four-point control arms with prismatic tubular hollow housing, but it also comprises tube shapes deviating from the prismatic shape, especially tubes with diameters varying over the length of the tube, with variable cross-sectional shape and variable wall thickness.

According to preferred embodiments of the present invention, provisions are made in this connection for the hollow housing of the four-point control arm to have a top view relative to the vehicle that is reduced in dimension in respect to the longitudinal axis of the vehicle and/or in respect to the transverse axis of the vehicle.

In other words, this means that in the top view of the vehicle, the hollow housing may have essentially any shape ranging from the (non-reduced) rectangle or trapezoid over the contour shape that is trumpet-shaped on one side or on both sides (reduced only in respect to the longitudinal axis of the vehicle OR in respect to the transverse axis of the vehicle) to the cross shape or X shape (reduced in respect to the longitudinal axis AND in respect to the transverse axis of the vehicle), without deviating from the principle of the tubular hollow housing open on both sides according to the present invention.

Against this background, provisions are made according to another, especially preferred embodiment of the present invention for the hollow housing to have an essentially one-piece cross-shaped or X-shaped shape in the top view related to the vehicle. The hollow housing is divided now in the top view into a recognizable central housing area and four peripheral control arms carrying the bearing eyes, without, however, the basic principle of the hollow housing formed essentially by a tube only being hereby abandoned.

This shape of the control arm housing is advantageous due to the fact that it corresponds to the X shape, which has long been successfully used in the massive or forged four-point control arms. However, the reduction of the diameter of the open tube forming the hollow housing, which reduction is a strong four-sided reduction associated with this shape, leads to a further improvement in the simple and technologically reliable manufacturability of the four-point control arm, especially, but by no means exclusively in four-point control arms that are manufactured according to the casting process.

This is linked with the fact that due to the great reduction, the undercuts formed on the basis of the interior space of the hollow housing are considerably reduced, on the one hand, and, on the other hand, the remaining undercuts are made, besides, greatly conical or tapering. This is advantageous especially, but not exclusively, when the four-point control arm is manufactured by casting, because the cantilevered length of the core can thus be kept especially small, as a result of which the core is supported even better against floating.

According to other preferred embodiments of the present invention, the control arms are shaped carriers subject to bending with profiled cross section or have an essentially C-shaped or U-shaped cross section.

The design of the control arms as profiled carriers subject to bending, especially as carriers subject to bending with a C-shaped or U-shaped cross section, is advantageous because part of the rather substantial deformations occurring during the operation of the four-point control arm can already be absorbed by the control arms. In addition, the control arms can thus have a weight-saving design, especially compared to the prior-art four-point control arms designed as massive forged parts. However, the C-shaped cross section is also advantageous compared to the already known double T-shaped cross section of the control arms of cast four-point control arms, because a C-shaped cross section simplifies the manufacturability of the four-point control arm and thus saves costs because its recess is present on one side only.

The latter is especially true when, as this is provided for in another, especially preferred embodiment of the present invention, the hollow housing is a casting. An embodiment as a shaped sheet metal part would also be conceivable.

In addition to the above-described general advantages in the manufacture of the four-point control arm according to the present invention, all cavities or recesses of the four-point control arm, especially including the recesses of the C-shaped control arms, as well as optionally including the recesses for the bearing eyes, can be manufactured with only one core in case of casting when the four-point control arm has, for example, an X-shaped design.

It is now readily obvious to the person skilled in the art of casting that a four-point control arm, for the manufacture of which only a single core is needed, which core can, moreover, be supported very well to boot, despite the constructively exacting resolution into a central, hollow housing area as well as into four control arms with a profiled cross section, can be manufactured with extremely high precision and with an extremely reliable process. This is in turn advantageous for the freedom of design, which means that the four-point control arm can be manufactured, for example, with a bulky cross section and at the same time with comparatively small wall thicknesses, without unacceptable tolerances or difficulties arising in the reproducibility of the wall thicknesses.

All this is advantageous for the quality of the component, failure-proofness and especially for the reduced weight of a four-point control arm designed according to the present invention, which is made hereby possible.

According to another preferred embodiment of the present invention, the hollow housing of the four-point control arm consists of bainitic cast iron. A four-point control arm with the shape according to the present invention, which consists, moreover, of bainitic cast iron, can, furthermore, be optimized concerning an especially favorable weight, in respect to the stiffness and flexibility properties dictated by design, as well as concerning high reliability of the process.

This is linked with the fact that bainitic cast iron, which is also used, among other things, as a light-weight material in mechanical and automotive engineering because of its superior strength and plasticity properties, possesses material parameters that are comparable to the corresponding parameters of high-value tempering steels. This is especially true of material parameters that are important for design, such as tensile strength, yield point and elongation at rupture.

However, bainitic cast iron has another important property. Even though the material parameters mentioned largely correspond, as described, to those of high-value structural steels, the modulus of elasticity of this cast iron is lower than that of these steels by about one fourth, which is not only not a disadvantage in respect to the four-point control arm in question, but rather a decisive advantage.

The consequence of the lower modulus of elasticity is that a four-point control arm can have a cross section with a larger volume at equal stiffness compared to steel if it is made of bainitic cast iron, without higher mechanical stresses occurring in the four-point control arm, at equal deformation.

This relationship is significant in a four-point control arm not least because extreme loads, which may be present in the form of extremely high torsional torques and, for example, in the case of great axle twistings on uneven terrain, even in the form of defined, imposed torsion angles, may also develop, besides the mostly bending and torsional stresses prevailing during the operation.

It is also significant in the same connection that lower mechanical stresses develop in the component in the case of a four-point control arm made of (bainitic) cast iron, which has, however, the same geometry as a four-point control arm made of steel, at equal deformation because of the lower modulus of elasticity. This means that a four-point control arm made of bainitic cast iron makes possible a greater reserve of the normal stresses occurring during operation in respect to the maximum stresses occurring and especially in respect to the maximum deformations occurring. This can be advantageously utilized in design in the form of reduced wall thicknesses and/or larger cross section volumes and consequently increased stiffness and/or reduced weight.

According to another, especially preferred embodiment of the present invention, the bearing eyes are made integrally in one piece with the hollow housing. This is especially advantageous, especially, but by no means exclusively, in the case of a four-point control arm made of cast iron, which is designed according to the present invention, because it is possible in this manner to generate an especially homogeneous and load-optimized course of the fiber and of the wall thicknesses in the component.

Furthermore, additional advantages can thus be achieved in terms of weight and consequently cost savings both on the blank and the finished part. Not least, only a single core is necessary, in principle, in such an embodiment, as it was already indicated above, the core forming both the recesses of the control arms, which have, for example, a C-shaped profile, and moreover, the recesses of the bearing eyes, which will later receive the joints.

According to another, preferred embodiment of the present invention, the bearing eyes of the four-point control arm have elastomer joints or molecular joints. Contrary especially to slide bearings, such as ball-and-socket joints, the ball piece is vulcanized within the bearing eye in rubber in molecular joints. This is advantageous, on the one hand, because the otherwise necessary sealing of the joint against water and dirt can thus be completely eliminated. On the other hand, molecular joints also have a potentially longer service life compared to conventional ball-and-socket joints, besides improved muffling of noises. In addition, the radial elasticity of molecular joints, or their elasticity in all directions prevents the kinematic redundancies known precisely in axle suspensions and the harmful overload on joints, control arms and other vehicle components, which is associated herewith.

However, molecular joints are of particular advantage from another viewpoint as well. As this is also provided for according to another, likewise preferred embodiment of the present invention, the radial stiffness of two or four of the elastomer joints of the four-point control arm in respect to the direction of roll of the vehicle may deviate from the radial stiffness in respect to the direction extending at right angles to the direction of roll, in particular, it may be smaller in the direction of roll than at right angles to the direction of roll.

In other words, this means that the four-point control arm with molecular joints has a higher elasticity in respect to directions of roll of the vehicle than in respect to motions of the axle in relation to the vehicle body in the horizontal plane. This leads to an especially stable and reliable axle and wheel guiding, but it also makes possible at the same time the necessary flexibility of the four-point control arm, provided by the design, against rolling motions and axle twistings during the operation of the vehicle.

If the elastomer joints are designed to be more flexible for motions in the direction of roll of the vehicle or with lower flexibility, the four-point control arm will thus, moreover, impose a greater deformation component of the rolling motions and axle twistings on the elastomer joints, which will in turn reduce the maximum stresses and maximum deformations occurring in the four-point control arm housing. The four-point control arm can thus obtain a further increased stiffness by the design, for example, by increasing the cross section volume along with a reduction of the wall thicknesses, without unacceptably high stresses developing in the four-point control arm at a given overall deformation. The weight is additionally reduced in this manner, as a result of which costs can in turn be reduced both in the manufacture and in the operation of the four-point control arm.

The present invention will be explained in greater detail below on the basis of drawings showing only one exemplary embodiment.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in a preferred embodiment of the invention is illustrated.

DESCRIPTION OF THE PREFERRED EMBODIMENT

Figure 1:
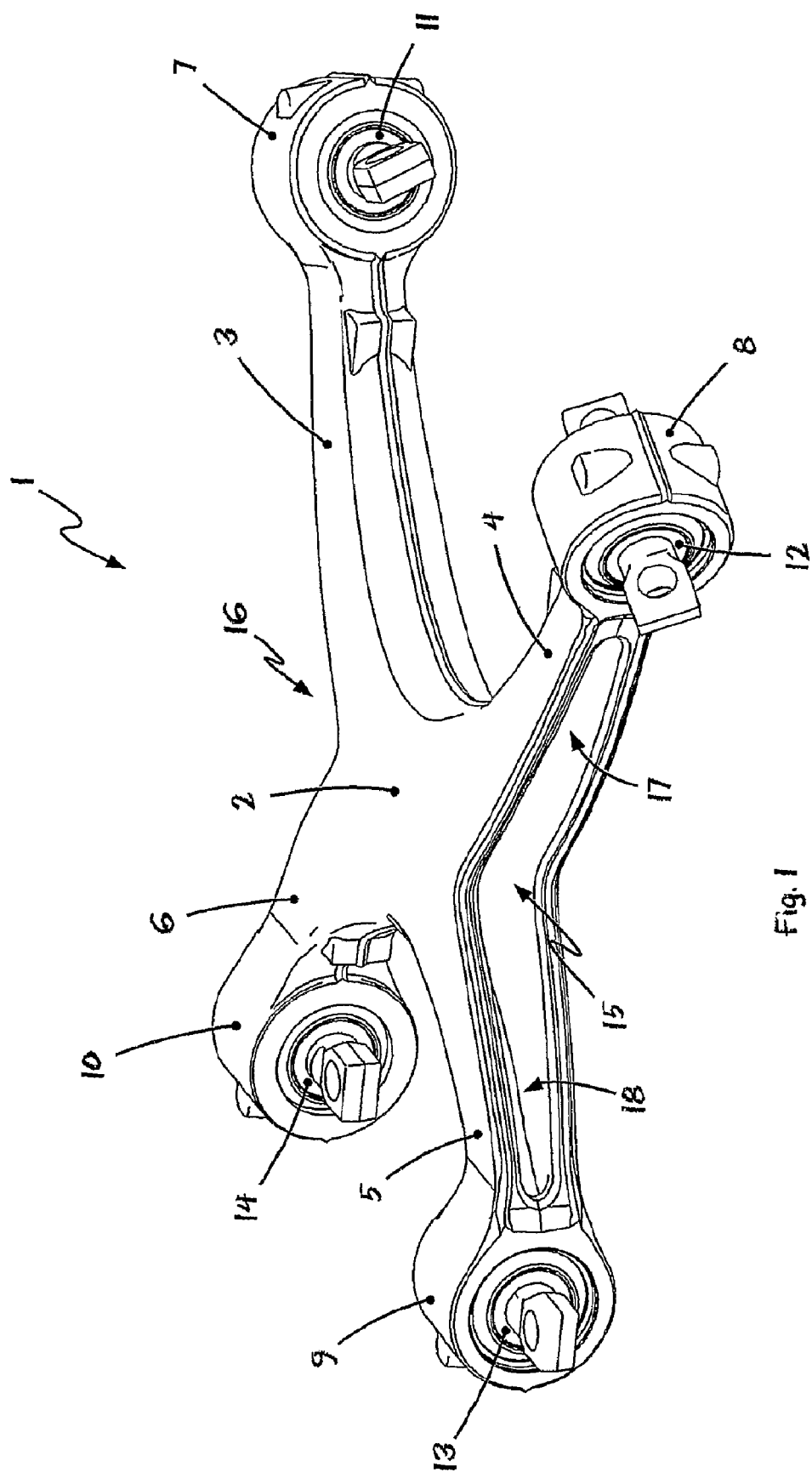
FIG. 1 is a perspective view of an embodiment of a four-point control arm according to the present invention.

Referring to the drawings in particular, FIG. 1 shows an embodiment of a four-point control arm 1 according to the present invention in an isometric or perspective view.

The essentially cross-shaped or X-shaped shape of the four-point control arm housing with a central, hollow housing area 2 and four control arms 3, 4, 5, 6 made integrally in one piece with the housing area 2 is first recognized. Furthermore, the bearing eyes 7, 8, 9, 10 made in one piece with the outer ends of the control arms 3, 4, 5, 6 each are recognized, each of the bearing eyes 7, 8, 9, 10 being already provided with the respective ball-and-socket joint or elastomer joint 11, 12, 13, 14 in the view according to FIG. 1.

It also appears already from the view in FIG. 1 that the hollow housing 2, 3, 4, 5, 6 of the four-point control arm 1 being shown has the tubular shape open on both sides according to the present invention. The hollow housing 2, 3, 4, 5, 6, which is expanded in a trumpet-like manner at 15 and 16 but otherwise continues, in principle, to be tubular as before, is greatly reduced here on all four sides, as a result of which the cross-shaped or X-shaped shape of the four-point control arm 1 being shown with the clearly formed control arms 3, 4, 5, 6 is obtained.

The extremely homogeneous, smooth transition of the control arms 3, 4, 5, 6 having a C-shaped cross section into the tubular central housing area 2, which is favorable for the especially uniform introduction of forces and for avoiding any load peaks in the material, is also formed in this manner in the four-point control arm 1 being shown.

The excellent suitability of the four-point control arm 1 being shown for manufacture according to a casting process becomes clear, in particular, from the view in FIG. 1. Namely, only a single, common core (not shown) is necessary for manufacturing the four-point control arm 1 being shown by casting for the purpose of forming the inner cavity 15, 16 as well as for forming the recesses 17, 18 of the control arms 3, 4, 5, 6 having a C-shaped cross section.

Moreover, as the person skilled in the art of casting technology will also immediately recognize even without an explicit view of the core, this core can be excellently supported in the casting mold because of the great reduction of the four-point control arm 1 on all sides, as a result of which any floating of the core and consequently any unintended change in the wall thicknesses of the casting are ruled out. This is favorable for the reliability of the casting process, for cost-effective manufacturability, as well as for the high precision of the component and consequently for the desired lightweight construction of the four-point control arm 1.

Moreover, the four bearing eyes 7, 8, 9, 10 of the four-point control arm, which are already provided with the corresponding elastomer joints 11, 12, 13, 14, may possibly also be manufactured in one and the same core, with which the cavity 15, 16 of the central housing area 2 as well as the recesses 17, 18 of the control arms 3, 4, 5, 6 are produced as well. As a result, this makes it possible to manufacture the four-point control arm 1 according to FIG. 1 with a nearly ideal combination of low production costs, high process reliability and high precision of the component.

Figure 2:
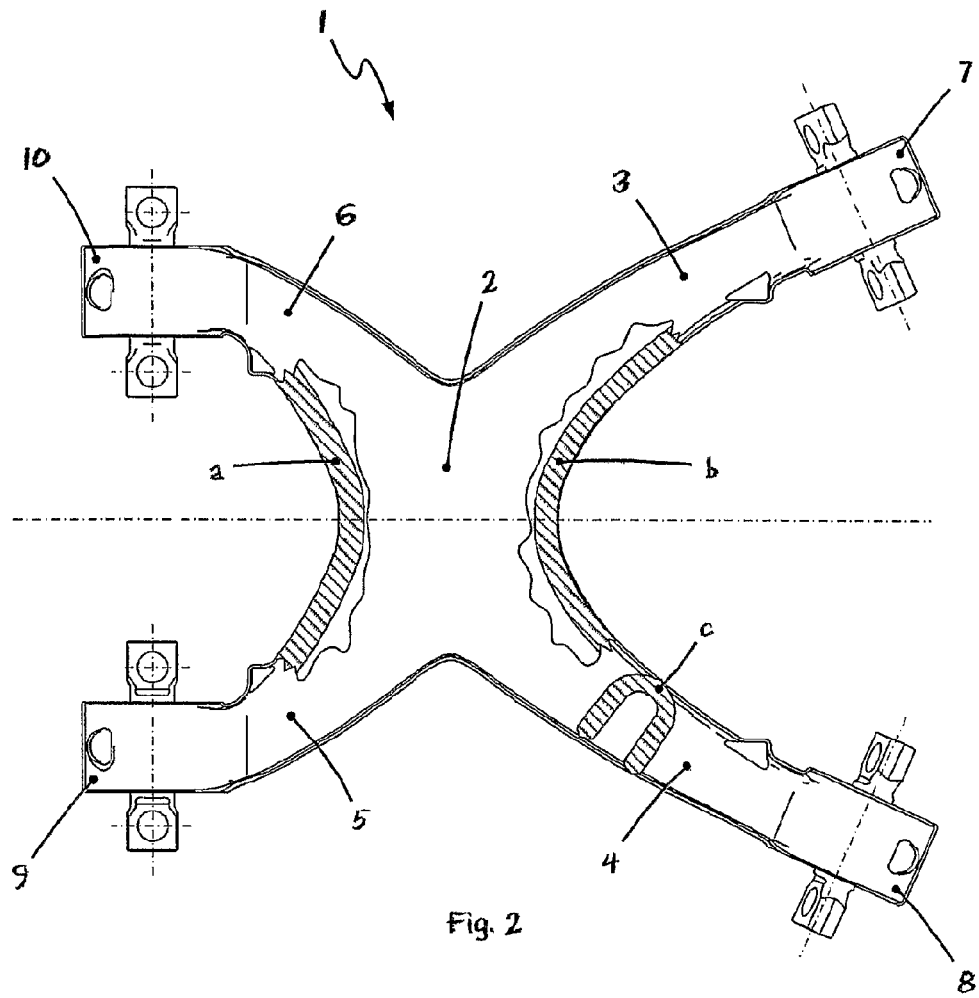
FIG. 2 is a partially cut-away view of a top view of the four-point control arm according to FIG. 1.

FIG. 2 shows the four-point control arm 1 according to FIG. 1 in a top view as seen relative to the installation situation on the utility vehicle. The areas a, b of the central housing area 2 are shown partly cut away or as a section in order to illustrate the shape and the design of the four-point control arm 1 being shown. In addition, the cross section of the control arms 3, 4, 5, 6 is faded in as an example at c.

It is recognized that a four-point control arm 1 is characterized by the shaping flowing extremely harmonically as a whole, as is shown in FIG. 2, which brings correspondingly favorable, uniform force curves with it. Thanks to the shaping according to the present invention, the four-point control arm 1 can be designed, moreover, in a load-optimized manner in the most favorable manner imaginable, despite uniform wall thicknesses a, b, c. In particular, the perfectly smooth transition of the control arms 3, 4, 5, 6 having a C-shaped cross section into the central, tubular housing area 2 shall be pointed out here. All this is favorable for both the high quality of the component and high loadability along with low weight of the four-point control arm 1.

Furthermore, it is again especially clearly recognized for the person skilled in the art of casting technology from the top view according to FIG. 2 that the four-point control arm 1 being shown is also optimally adapted to manufacture by casting, which is preferably intended, besides the load-optimized shape. The great reduction on all sides shall be mentioned, in particular, which permits especially the optimal supporting of the one-piece core based on the short cantilevered length of the core, which short length is made possible by the reduction, and the optimal supporting is, in turn favorable for the quality of the component and for the accurate reproduction of the intended wall thicknesses a, b, c.

Figure 3:
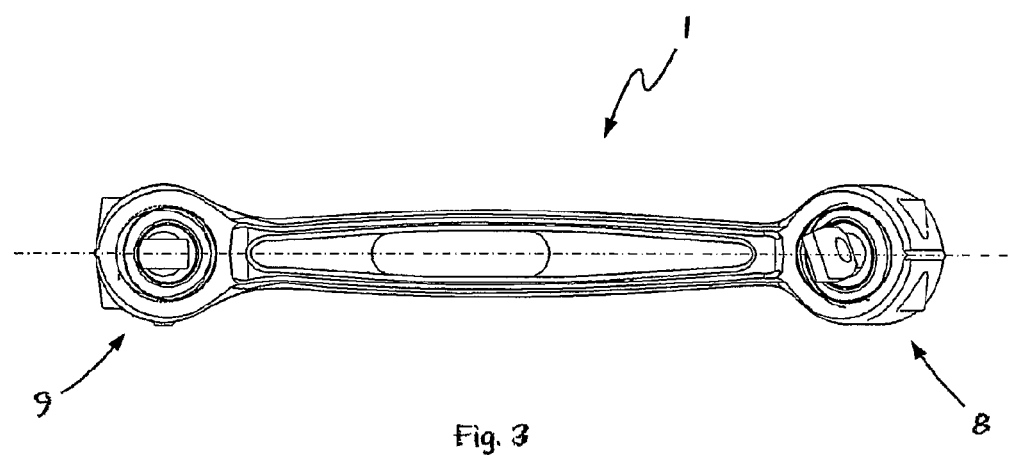
FIG. 3 is a side view of the four-point control arm according to FIGS. 1 and 2.

FIG. 3 shows the four-point control arm 1 according to FIGS. 1 and 2 once again in a side view. The smooth shape of the four-point control arm 1, which continues up to the bearing eyes 8, 9, with the uniform wall thicknesses made possible hereby along with the simultaneous load optimization by hollow cross sections of different sizes, is clearly recognizable here as well. This shape is, in turn, favorable for both the problem-free manufacturability of the four-point control arm 1 by casting and the lowest possible weight of the four-point control arm 1, especially when the bainitic cast iron described above is used as the material for manufacturing the four-point control arm 1.

As a result, it thus becomes clear that it becomes possible, thanks to the present invention, to design four-point control arms for axle guiding especially for utility vehicles in the most ideal manner conceivable in a load-optimized manner. However, the manufacture of the four-point control arm especially by casting is substantially simplified at the same time thanks to the special geometry of the four-point control arm according to the present invention, and the reliability of the manufacturing process is substantially improved.

Especially cost-effective production of the four-point control arm can thus be carried out, but the four-point control arm will at the same time acquire a substantially improved quality of the component. Based on the load-optimized design of the four-point control arm, which is made possible by the present invention, the weight of the four-point control arm can be substantially reduced with unchanged stiffness values and with unchanged failure-proofness, which is favorable for economic viability especially during the operation of the utility vehicle.

Thus, the present invention makes a very substantial contribution to the improvement of axle guiding or axle suspension for utility vehicles, and it is at the same time possible to reduce the manufacturing costs for the corresponding four-point control arms. Not least, this is favorable for reducing the fuel consumption, for improving driving safety, for the cost effectiveness of production, as well as for improved systems technology of the utility vehicle.

While a specific embodiment of the invention has been shown and described in detail to illustrate the application of the principles of the invention, it will be understood that the invention may be embodied otherwise without departing from such principles.

The invention claimed is:

1. A four-point control arm for the axle suspension of a rigid axle of a vehicle, the four-point control arm comprising:
a one-piece, rectangular or trapezoidal hollow housing defining four bearing eyes, of which two of said bearing eyes are for connection to the axle and two of said bearing eyes are for connection to the vehicle chassis, each in an articulated manner, said hollow housing being formed essentially by a tube arranged horizontally with respect to the vehicle and open on a plurality of sides, with an essentially rounded cross section ranging from rounded rectangular to O-shaped shape, wherein the longitudinal axis of the tube forming said hollow housing extends at right angles to the longitudinal axis of the vehicle.

2. A four-point control arm in accordance with claim 1, wherein said hollow housing is designed as a tube open on two sides.

3. A four-point control arm in accordance with claim 1, wherein said hollow housing is reduced in dimension relative to the longitudinal axis of the vehicle in the vehicle-related top view.

4. A four-point control arm in accordance with claim 1, wherein said hollow housing is reduced in dimension relative to the longitudinal axis of the vehicle in the vehicle-related top view.

5. A four-point control arm in accordance with claim 1, wherein said hollow housing has an essentially one-piece cross-shaped or X-shaped shape in the vehicle-related top view with a central housing area and four said peripheral control arms carrying said bearing eyes.

6. A four-point control arm in accordance with claim 5, wherein said control arms are designed as carriers subject to bending, which are profiled in said cross section.

7. A four-point control arm in accordance with claim 5, wherein a cross-sectional shape of said control arms has essentially the shape of a C or of a horizontal U.

8. A four-point control arm in accordance with claim 1, wherein said hollow housing comprises a casting or a shaped sheet metal part.

9. A four-point control arm in accordance with claim 8, wherein said hollow housing consists essentially of bainitic cast iron.

10. A four-point control arm in accordance with claim 1, wherein said bearing eyes are made integrally in one piece with said hollow housing.

11. A four-point control arm in accordance with claim 1, wherein said bearing eyes have elastomer joints or molecular joints.

12. A four-point control arm in accordance with claim 11, wherein the radial stiffness of two or four of said elastomer joints is lower in the direction of roll of the vehicle than in the direction extending at right angles to the direction of roll.

13. A four-point control arm comprising:
a one-piece tubular housing with a tube open on two sides, said tubular housing defining four bearing eyes including two vehicle axle bearing eyes and two vehicle chassis bearing eyes, said tubular housing tube having an essentially rounded cross section ranging from rounded rectangular to an O-shaped shape, wherein a longitudinal axis of said tubular housing tube extends at right angles to a vehicle longitudinal axis direction.

14. A four-point control arm in accordance with claim 13, wherein said hollow housing has central housing area and peripheral control arms each with one of said four bearing eyes, said central housing area and peripheral control arms having an essentially one-piece cross-shaped or X-shaped shape.

15. A four-point control arm in accordance with claim 13, wherein said peripheral control arms are profiled to have an essentially C-shaped or U-shaped cross section.

16. A four-point control arm in accordance with claim 13, wherein said hollow housing is comprised of bainitic cast iron.

17. A four-point control arm in accordance with claim 13, wherein said bearing eyes have elastomer joints or molecular joints.

18. A four-point control arm in accordance with claim 17, wherein a radial stiffness of two or four of said elastomer joints is lower in a vehicle direction of roll than in a direction extending at right angles to said direction of roll.

19. A four-point control arm for the axle suspension of a rigid axle of a vehicle, the four-point control arm comprising:
a one-piece, rectangular or trapezoidal hollow housing defining four bearing eyes, of which two of said bearing eyes are for connection to the axle and two of said bearing eyes are for connection to the vehicle chassis, each in an articulated manner, said hollow housing being formed essentially by a tube arranged horizontally with respect to the vehicle and open on a plurality of sides, with an essentially rounded cross section ranging from rounded rectangular to O-shaped shape, said hollow housing having an essentially one-piece cross-shaped or X-shaped shape in the vehicle-related top view with a central housing area and four said peripheral control arms carrying said bearing eyes, wherein a cross-sectional shape of said control arms has essentially the shape of a C or of a horizontal U.

20. A four-point control arm comprising:
a one-piece tubular housing with a tube open on two sides, said tubular housing defining four bearing eyes including two vehicle axle bearing eyes and two vehicle chassis bearing eyes, said tubular housing tube having an essentially rounded cross section ranging from rounded rectangular to an O-shaped shape, wherein said peripheral control arms are profiled to have an essentially C-shaped or U-shaped cross section.

* * * * *

UNITED STATES PATENT AND TRADEMARK OFFICE
CERTIFICATE OF CORRECTION

| | | |
|---|---|---|
| PATENT NO. | : 7,753,384 B2 | Page 1 of 1 |
| APPLICATION NO. | : 10/599161 | |
| DATED | : July 13, 2010 | |
| INVENTOR(S) | : Ralf Kunze et al. | |

It is certified that error appears in the above-identified patent and that said Letters Patent is hereby corrected as shown below:

Title page item (73) Assignee: should read: ZF Friedrichshafen AG, Friedrichshafen, Germany Signed and Sealed this Sixteenth Day of November, 2010

David J. Kappos
*Director of the United States Patent and Trademark Office*